United States Patent [19]
Dorau et al.

[11] Patent Number: 5,362,395
[45] Date of Patent: Nov. 8, 1994

[54] METHOD AND APPARATUS FOR BIOLOGICALLY PURIFYING SEWAGE WHICH IS ORGANICALLY LOADED WITH SUBSTANCES DIFFICULT TO DECOMPOSE BIOLOGICALLY OR NOT DECOMPOSABLE BIOLOGICALLY

[75] Inventors: Wolfgang Dorau, Berlin; Friedrich Wagner, Heumeiler; Herbert Wienands, Teningen; Robert Rautenbach; Rainer Mellis, both of Aachen, all of Germany

[73] Assignee: Wehrle-Werk AG, Emmedingen, Germany

[21] Appl. No.: 851,050

[22] Filed: Mar. 13, 1992

[30] Foreign Application Priority Data

Mar. 13, 1991 [EP] European Pat. Off. ........ 91 103860.2

[51] Int. Cl.$^5$ .............................................. C02F 1/44
[52] U.S. Cl. .................................... 210/638; 210/651; 210/259
[58] Field of Search ............ 210/259, 651, 652, 257.2, 210/96.2, 631, 638, 197

[56] References Cited

U.S. PATENT DOCUMENTS

| | | | |
|---|---|---|---|
| 3,950,249 | 4/1976 | Eger et al. | 210/197 X |
| 4,267,049 | 5/1981 | Erickson et al. | 210/631 X |
| 4,274,966 | 6/1981 | Palmer | 210/631 X |
| 5,130,025 | 7/1992 | Lefebvre et al. | 210/638 |

FOREIGN PATENT DOCUMENTS

| | | |
|---|---|---|
| 413356A1 | 2/1991 | European Pat. Off. |
| 3709174 | 9/1988 | Germany |
| 3811591 | 10/1989 | Germany |
| 3815271 | 11/1989 | Germany |

OTHER PUBLICATIONS

European search Report, application No. 91103860.2, 3 pages.
Abstract, World Patents Index, Section CH, Week 8040, Derwent Publ. LTD London, GB; Class C, AN 80-70612C & JP-A-55 109(EBARA INFL.KK) Aug. 22, 1980.

Primary Examiner—Frank Spear
Attorney, Agent, or Firm—Herbert Dubno

[57] ABSTRACT

Biologically purifying sewage which is organically loaded with substances that are difficult to decompose biologically or are not decomposable biologically has the substances that are difficult to decompose biologically or are not decomposable biologically separated and concentrated to concentrate, the concentrate preferably is treated physically and/or chemically and the treated or untreated concentrate is subjected to a biological transformation or, alternatively, the concentrate is separated from the sewage to be purified. The apparatus has a filtration collecting-basin serving for concentrating the substances that are difficult to decompose biologically or not decomposable biologically, and a membrane-filtering or nanofiltering device connected thereto, in which the substances that are difficult to decompose biologically or not decomposable biologically are retained and to which the sewage with the concentrated substances that are difficult to decompose biologically or not decomposable biologically is supplied on the inlet side, and from which the purified sewage is drawn off on the outlet side.

31 Claims, 1 Drawing Sheet

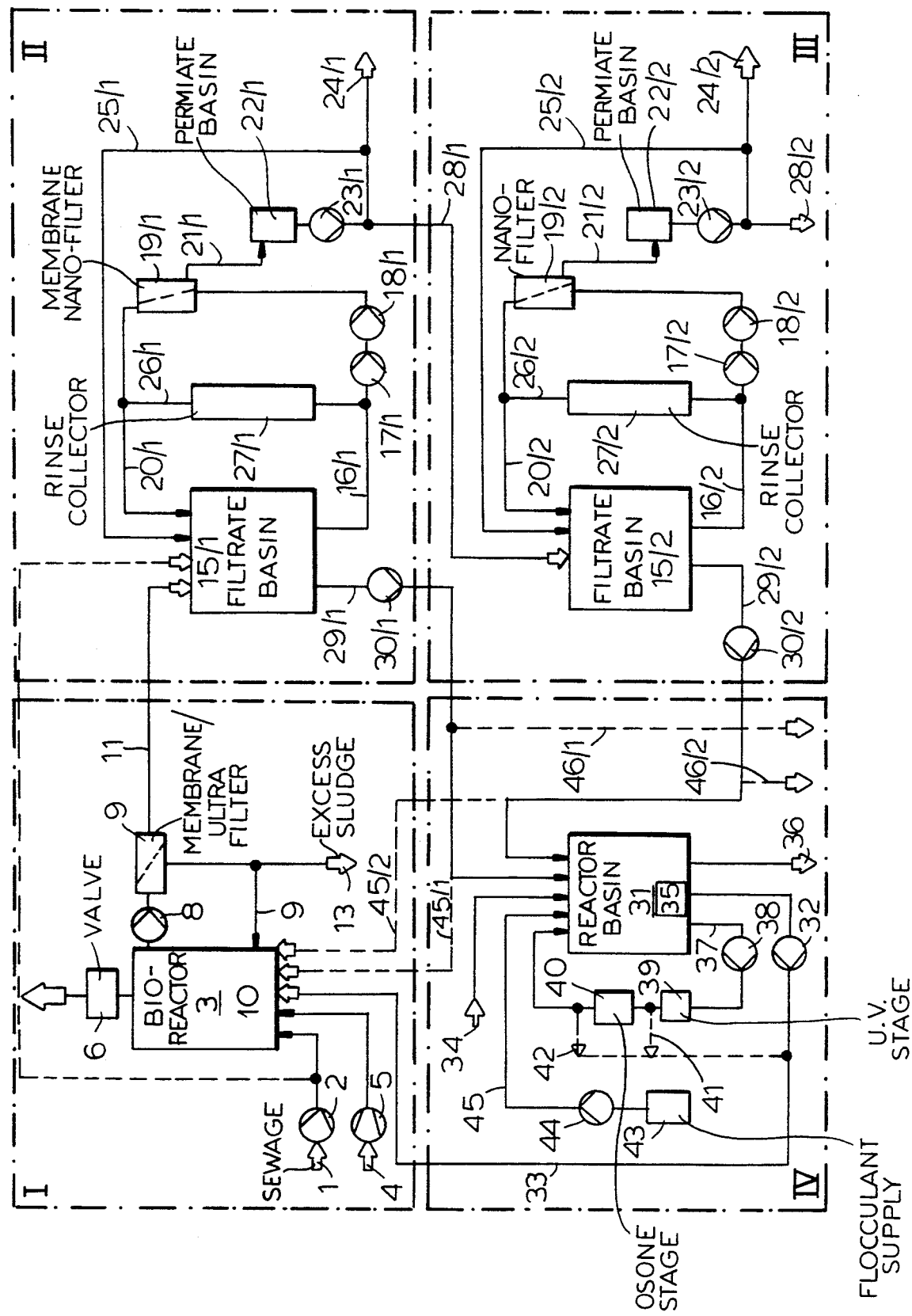

METHOD AND APPARATUS FOR BIOLOGICALLY PURIFYING SEWAGE WHICH IS ORGANICALLY LOADED WITH SUBSTANCES DIFFICULT TO DECOMPOSE BIOLOGICALLY OR NOT DECOMPOSABLE BIOLOGICALLY

FIELD OF THE INVENTION

This invention relates to a method of biologically purifying sewage which is organically loaded with substances that are difficult to decompose biologically or are not decomposable biologically, and to an apparatus for carrying out this method. In particular, the invention relates to a method of biologically purifying sewage that makes it possible to biologically decompose all of the organic substances even when these originally may be difficult to decompose biologically or are not decomposable biologically, down to traces of substances and to remove remaining non-decomposable substances. The invention also relates to an apparatus for carrying out this method.

BACKGROUND OF THE INVENTION

It is known to subject sewage which is loaded with organic substances to biological purification, with the organic substances contained in the sewage being transformed microbically. In this microbic transformation, the substances contained in the sewage are converted into harmless metabolic products and other microbic substances, biological sludge being produced thereby. The biological sludge may be separated either by separation in sedimentation or flotation plants based on the different densities, or by filtration in a membrane filter or ultrafilter so that a virtually total solid-liquid separation is achieved, to produce an effluent with a very high degree of purity.

A method of the latter type, in which the microbic transformation takes place under superatmospheric pressure and the separation of the treated sewage from the biological sludge is effected by filtration in a membrane filter or ultrafilter, is disclosed in DE 37 09 174 C2. This document details microbic transformation under superatmospheric and separation of the treated sewage from the biological sludge by membrane filtration or ultrafiltration.

The method known from DE 37 09 174 C2 has been extremely successful in purifying sewage loaded with biologically decomposable organic substances. In this method, in which transformation takes place under superatmospheric pressure, increased biomass concentrations can be obtained by the almost total solid-liquid separation which is largely independent of the physical properties of the micro-organisms. The to biomass concentrations improve performance by several times over that of earlier methods. The total solid-liquid separation makes it possible to effect extremely high degrees of purity in the effluent, up to the retention of all bacteria. The pressures at transformation and filtration can largely be set uniformly, so that the active biomass will not be exposed to excessive differential pressures that might be detrimental.

Organic substances dissolved in the sewage, which are difficult to decompose biologically or not decomposable biologically, as well as organic and inorganic substances whose particles are of a smaller size than is separated by the membrane, are still contained in the treated sewage which has been separated from the biological sludge, thus loading the natural waters which receive the treated effluent, or limiting any further industrial utilization of the treated sewage.

OBJECTS OF THE INVENTION

It is therefore an object of the invention to provide a method of biologically purifying sewage organically loaded with substances that are difficult to decompose biologically or are not decomposable biologically, which method makes it possible for the substances that are difficult to decompose biologically or not decomposable biologically to be biologically purified and transformed into harmless products.

It is a further object of the invention to provide a method of biologically purifying sewage organically loaded with substances that are difficult to decompose biologically or are not decomposable biologically, in which the substances that are difficult to decompose biologically or not decomposable biologically are treated chemically and/or physically to such a degree that it is possible to separate them from the sewage.

It is a further object of the present invention to provide a method of biologically purifying sewage organically loaded with substances that are difficult to decompose biologically or not decomposable biologically, in which the substances that are difficult to decompose biologically or not decomposable biologically are treated by chemical and/or physical treatment so that the substances are microbically transformable and can be converted into biologically harmless metabolic products and microbic substances intrinsic to the organic contaminants, or can be discharged in a concentrated form together with the inorganic substances.

It is a further object of the present invention to provide a method for biologically purifying sewage organically loaded with substances that are difficult to decompose biologically, in which the substances that are difficult to decompose biologically are transformed microbically merely by repeated recirculation and repeated biological attack.

One further object of the invention is to provide an apparatus for carrying out a method of this type.

SUMMARY OF THE INVENTION

According to a first aspect of the invention, a method of biologically purifying sewage which is organically loaded with substances that are difficult to decompose biologically or are not decomposable biologically comprises concentrating those substances which are difficult to decompose biologically or are not decomposable biologically to a concentrate. The concentrate preferably is physically and/or chemically treated. The treated concentrate is subjected to a biological treatment. In the physical and/or chemical treatment, the organic substances which are difficult to decompose biologically or are not decomposable biologically are destroyed to a degree that makes it possible to decompose the destruction products biologically and/or to draw them off together with the inorganic substances via adsorption or precipitation/flocculation reactions, and to subject the concentrate treated in this way to a biological transformation.

According to a second aspect of the invention, a method of biologically purifying sewage which is organically loaded with substances difficult to decompose biologically or are not decomposable biologically is provided in which said substances which are difficult to decompose biologically or are not decomposable biologically are concentrated to a concentrate, the concentrate preferably is physically and/or chemically treated, and in which the treated concentrate is discharged.

According to another, third aspect of the invention, it may be sufficient in this context to merely concentrate the substances that are difficult to decompose biologically or which cannot be decomposed biologically to a concentrate and to once again subject, without any additional treatment, all or part of the concentrate to the biological treatment.

If the quantity of substances that cannot be decomposed biologically is so small that it can be separated quantitatively with the excess sludge from the biological treatment, the returning of the concentrate of substances that are difficult to decompose biologically and those that cannot be decomposed biologically once more to the biological purification and the resultant prolongation and intensification of the biological decomposition may be sufficient for converting the substances that are difficult to decompose biologically into biologically harmless metabolic products and intrinsic microbic substances even without physical and/or chemical treatment.

According to this further, third aspect of the invention, the concentrate can be returned to a biological treatment stage even without physical or chemical treatment if the content of substances that cannot be decomposed biologically as well as inorganic substances that remains in the concentrate after filtration is so low that these substances, either in dissolved form or adsorptively combined with the excess sludge, can leave the circulation together with the excess sludge from the biological treatment stage.

The confinement to separating and concentrating the substances that are difficult to decompose biologically and the substances that cannot be decomposed biologically leads to an increasing concentration and to a considerably prolonged time during which these substances are in the biological treatment stage when the concentrate is returned to the biological treatment stage. This and the complete or partial return of the bacteria mass, too, to the biological stage considerably favor adaptation of the microorganisms to these substances and accelerate biological decomposition reactions. This effect may be sufficient to intensify the microbic transformation of the substances that are difficult to decompose biologically such that a supplemental physical and/or chemical treatment of the concentrate is not necessary or is only necessary to some extent.

It is a special advantage of the invention that the use of the inventive apparatus for separating and concentrating substances that are difficult to decompose biologically or cannot be decomposed biologically as well as returning and treating the concentrate on principle is independent of the kind of any preceding biological treatment. Any existing or new biological treatment stages thus can be advantageously combined with this invention or supplemented by it.

By concentrating the substances which are difficult to decompose biologically or cannot be decomposed biologically and by the following physical and/or chemical treatment as provided in the method according to the invention, the substances are changed in such manner that either they are suitable for biological purification in the form of microbic transformation and are converted into biologically harmless metabolic products and intrinsic own microbic substances, or can be discharged in a concentrated form.

It is particularly advantageous to effect the concentrating by filtration in a membrane-filtering device, preferably a nano-filtering device. Thereby, almost full retention of organic and, after biological pre-treatment, essentially all substances that are difficult to decompose biologically or are not decomposable biologically is achieved, so that only low-molecular substances that are dissolved, mainly salts, are discharged with the treated sewage, with the retention and the discharge being variable by selecting adequate membranes. The retention of inorganic substances is limited by the specific effect of the physical/chemical methods as to each substance, which methods eliminate these substances from the concentrate through adsorption and precipitation/flocculation reactions.

After biological purification and solid separation, the purified sewage mainly and, in the case of very good purification, almost exclusively contains substances that cannot be decomposed biologically or are difficult to decompose biologically even if the time of contact with the biomass is sufficiently long. This is of even greater importance in view of the fact that for many of these residual substances the possibility of biological decomposition or of any other elimination from the waters that is not harmful to the environment is low. The invention advantageously makes it possible to remove even these substances from the sewage as an important step for keeping the waters clean, which, in particular, is due to the employment of membrane filtration, preferably nano-filtration.

Concentration-dependent biological, physical and chemical reactions that take place in known continuous-flow purification plants require long reaction times or a high excess of chemicals if the low residual concentrations of organic or inorganic sewage substances as set in the reaction chamber have to simultaneously secure the required purity and are as well responsible for the long reaction times as a driving force for the biological, physical and chemical reactions because of the remaining low concentration differences. Owing to this coupling, lower residual concentrations will result in higher volumes of the basins, and in higher specific costs for energy and chemicals, respectively, and so there is an economical limit to methods with such coupling.

The method according to the present invention advantageously decouples the purity aimed at and reaction kinetics by utilizing the excellent capability of nanofiltration to retain organic substances while passing water in the form of the permeate, which water is purified to a very high degree and of a quality that is largely independent of pre-treatment stages or the concentrate treatment, respectively. Simultaneously, there is the advantage that the substances retained in the filtered matter are in a concentrated form, with the possibility of intensifying the concentration of the retained substances by repeating the filtration several times until the desirable and suitable degree has been reached. It is particularly advantageous that the concentrated substances - independently of the low concentrations in the permeate, can be converted and/or biologically decomposed with special efficiency in the further chemical/physical and/or biological treatment stages because of the high concentration and the higher reaction rates connected thereto.

A particularly high purification effect is achieved in that the concentrating is carried through in a plurality of serially connected membrane-filtering devices, preferably nano-filtering devices.

It is of special advantage to carry through the concentrating of the substances that are difficult to decompose or are not decomposable, as well as inorganic substances, continuously in a process of one or more stages until a predetermined desirable and arbitrarily settable concentration has been reached, and to draw off the permeate obtained during filtration as purified sewage when a predetermined desired retention of the substances that are difficult to decompose or are not decomposable has been reached or, when a sufficient degree of retention has not yet been reached, to subject it to a second or further stage of treatment in which the separation effect is further increased, until the desired is achieved and the permeate can be drawn off as purified sewage.

It has proved to be particularly effective to treat the concentrate by ultraviolet radiation and/or a chemical oxidant. By the treatment with ultraviolet radiation and a chemical oxidant, such as ozone or $H_2O_2$, particularly reactive atomic oxygen is used to convert for example halogenated hydrocarbons into halogenide and substances that are not harmful to the environment. Also, long-chain and cyclic hydrocarbons are broken up and converted into biologically decomposable substances. One special advantage of the destruction of biologically non-decomposable organic substances by these methods is that no residual substances are provided. Further, one special advantage of the method according to the invention is that the destruction by means of these methods may take place particularly efficiently at the high concentrations which have specifically been set before and needs to be carried through with a minimum of efforts only to such an extent that no disagreeably high concentrations of substances will build up in the circuit of biological treatment, nano-filtration and chemical/physical treatment.

Alternatively, or additionally, the concentrate may in particular be treated with an adsorbent or with a flocculant and/or precipitant.

According to the second aspect of the invention the method may advantageously be such that the concentrate is treated by adsorption, flocculation and/or precipitation of the biologically non-decomposable substances and that the adsorption, flocculation and/or precipitation sludge which is formed and to which the biologically non-decomposable substances are attached is removed after the chemical/physical treatment. In this way it is possible to concentrate substances that are dissolved in the sewage to be purified, or dispersed persistent substances, such as heavy metals, and to convert them as a concentrate into a separable form for further chemical or physical processes, like adsorption on activated carbon, bentonite, or other chemical processes by means of flocculation and precipitation reactions, and to extract them from the sewage to be purified.

In a useful modification, the treated concentrate is subjected to aerobic biological sewage purification where a microbic transformation into biologically harmless metabolic products and intrinsic microbic substance takes place. Alternatively, for purification, the treated concentrate may also be subjected to an anaerobic sewage treatment.

It is of special advantage to carry through a biological sewage purification before the substances that are difficult to decompose biologically or not decomposable biologically are separated and concentrated. Thereby, all substances that are easy to decompose biologically have already been extracted by biological transformation from the sewage to be purified, so that the separation and concentration are limited to those substances that are difficult to decompose biologically or not decomposable biologically, thus achieving a high efficiency of the method according to the invention.

The regeneration of the membrane-filtering or nano-filtering device intended for the concentrating through filtration is preferably effected by rinsing intervals.

The physical and/or chemical treatment of the concentrate may be effected discontinuously or continuously. It is of special advantage to effect the concentrating and the physical/chemical treatment of a partial flow of the concentrate continuously, which is advantageous especially when the concentrating takes place in several serially connected filtering devices.

According to a particularly advantageous modification of the method, the treated concentrate is further treated a biological sewage purification plant in which microbic transformation is carried out under superatmospheric pressure and the treated sewage is separated from the biological sludge by means of membrane filtration or ultrafiltration. Here it is of advantage to use in particular the method described in DE 37 09 174 C2, according to which the microbic transformation is carried out under superatmospheric pressure and the separation of the treated sewage from the biological sludge is carried out by filtration in an ultrafilter.

The use of a sewage purification plant of such type, in which a microbic transformation is carried out under superatmospheric pressure and the treated sewage is separated from the biological sludge through membrane filtration and/or ultrafiltration, as described in DE 37 09 174 C2, is of particular advantage for biologically purifying the sewage before the substances that are difficult to decompose biologically or not decomposable biologically are separated and concentrated.

Through the method described in DE 37 09 174 C2 a virtually total solid-liquid separation of the biological sludge from the sewage after carrying out a biological purification is possible, whether before the concentrating or for further biological purification of the concentrate which has already been treated physically or chemically, with the separation being largely independent of the physical properties of the microorganisms occurring.

Another important aspect of the method according to the invention is that the residence times of the water, the substances that are easy to decompose biologically, the substances that are difficult to decompose biologically and the substances that cannot be decomposed biologically are in the purification process, in particular in a water circuit formed by biological purification, membrane filtration, physical/chemical treatment and/or bypass stages which by-passes the physical/chemical treatment, are decoupled from each other with use of a membrane filtering device by the different retentions of these substances in the membrane filtering device. Thereby the durations for which the respective substances are in the purification process can be adapted individually to the time required for their decomposition up to the desired minimum concentrations.

Due to the different retention of the substances that are easy to decompose biologically and of those that are difficult to decompose biologically in the membrane filtering device, also the increases in concentration of the substances that are easy to decompose biologically and of those that are difficult to decompose biologically in the purification process, in particular in a water circuit formed by biological purification, membrane filtration, physical/chemical treatment and/or a bypass which by-passes the physical/chemical treatment, are decoupled from each other so that the concentration of the substances that are difficult to decompose biologically can be increased to a level where the latter can be decomposed biologically.

For carrying out the method, according to the invention there is provided an apparatus which comprises a filtration collecting-basin serving for the concentrating of the substances of the sewage that are difficult to decompose biologically or are not decomposable biologically, and a membrane-filtering or nano-filtering device connected thereto in which the substances that are difficult to decompose biologically or are not decomposable biologically are retained and to which the sewage with the biologically difficult to decompose or not decomposable substances to be concentrated are supplied on the inlet side and from which the purified sewage is drawn off on the outlet side.

Before the apparatus according to the invention is advantageously connected a biological sewage purification plant as described in DE 37 09 174 C2, which comprises a pressure-loaded bioreactor serving for the microbic transformation of the biologically decomposable substances of the sewage, to which reactor the sewage containing both the biologically decomposable substances and the substances that are difficult to decompose biologically or are not decomposable biologically is supplied on the inlet side, and a membrane-filtering or ultra-filtering device connected to the bioreactor and retaining the biological sludge produced in the bioreactor. The membrane-filtering or ultra-filtering device is connected to the bioreactor on its inlet side and discharged of the sewage which has been purified from the biological sludge on its outlet side, which sewage is then supplied to the filtration collecting-basin serving for the concentrating of the substances that are difficult to decompose biologically or are not decomposable biologically.

The nature of the concentrate advantageously is controlled continuously by conductivity determination, turbidity-measuring or an analyzer device.

According to one particularly advantageous embodiment of the invention, an apparatus for wet-chemical oxidation, such as a combination of an ultraviolet-exposure device and a device delivering an oxidant, like ozone or $H_2O_2$, is provided for destruction of the substances that are difficult to decompose biologically or are not decomposable biologically after a predetermined concentration thereof has been reached.

According to one further embodiment of the apparatus according to the invention, in order to remove persistent substances, such as heavy metals, there is provided a reaction basin in which these substances are further concentrated adsorptively, e.g. by means of activated carbon, bentonite or by means of a flocculent and/or precipitant, after a predetermined concentration of the substances that are difficult to decompose biologically or are not decomposable biologically has been reached, and are removed from the chemical/physical treatment stage. The wet-chemical oxidation advantageously takes place continuously, treating only a partial flow of the concentrate.

Finally, there may be provided a plurality of filtration stages for concentrating the substances that are difficult to decompose biologically or not decomposable biologically.

In the following the invention will be described in terms of an embodiment of the invention. Additional features, details and advantages of the invention will follow from the description, but the invention is, by no means limited to the details contained in the description.

BRIEF DESCRIPTION OF THE DRAWING

The sole FIGURE of the drawing is a diagram of an apparatus for carrying through the method according to the invention, in which the part of the figure that is marked by "I" represents a stage for biologically treating the sewage to be purified before the concentrating, the parts of the figure that are marked by "II" and "III" represent stages for the separation and concentrating of the substances that are difficult to decompose biologically or not decomposable biologically, and in which the part of the figure that is marked by "IV" represents a stage for the physical and chemical treatment of the concentrate.

SPECIFIC DESCRIPTION

As can be seen from the sole FIGURE of the drawing, in the treatment stage where the easily biologically decomposable substances contained in the sewage to be purified are biologically treated, the sewage 1, which is additionally organically loaded with substances that are difficult to decompose biologically or are not decomposable biologically, is supplied to a bioreactor 3 by means of a supply pump 2. In case of aerobic treatment, air 4, which is compressed by means of a compressor 5, is supplied to the bioreactor in which sewage substances are decomposed biologically. The case of an anaerobic treatment, the system pressure is obtained by the sewer gas production. A pressure-keeping valve 6 connected at the bioreactor serves for discharge of the gas 7 which is consumed at the aerobic treatment or formed in the case of anaerobic treatment in the bioreactor 3.

The bioreactor is connected via a filter pump 8 to a membrane-filtering or ultra-filtering device 9 which becomes charged with the biological sludge 10 from the bioreactor 3 which is produced when microbically transforming the substances that are easy to decompose biologically. The membrane-filtering or ultra-filtering device 9 comprises a semipermeable filtering membrane which is permeable to water and substances that are dissolved in water, while all solid substances that are floating or suspended in the water such as in particular the sludge particles formed at the microbic transformation and the microorganisms themselves which are present in the bioreactor are retained. The pore size of the membrane of the filtering device 9 is, for example, such that all particles larger than $0.2\mu$ are retained. Preferably, the structure of the membrane is such that all particles larger than $0.1\mu$ are retained. Finally, it is of special advantage if the membrane structure is such that all particles larger than $0.02\mu$ are retained.

Consequently, in the membrane-filtering device 9 a separation of the sludge 10 from the biologically purified sewage 11 is effected. The sludge concentrate 12 returned to the bioreactor is again available there to undergo energetic metabolism by the microorganisms. The excess sludge 13 produced as a result of the energetic metabolism by the microorganisms is extracted from the biological treatment stage I.

In a subsequent nano-filtration stage, marked in the drawing by "II", the sewage 11 which has been pretreated in the biological treatment stage I, or the absolutely untreated sewage 14 directly supplied from the supply pump 2 (broken lines in the drawing) and organically loaded with substances that are difficult to decompose biologically or not decomposable biologically, is subjected to a further treatment.

First of all, the biologically treated 11 or untreated 14 sewage, respectively, is passed into a filtration collecting-basin 15/1 in which concentrating is carried out by supplying the sewage 16/1 via an admission-pressure pump 17/1 and a filtration pump 18/1 to a membrane-/nano-filtering device 19/1. The membrane-/nano-filtering device 19/1 comprises a semipermeable membrane, the structure of which is such that it is permeable only to particles that are considerably smaller than those retained by the ultra-filtering device 9 of the biological treatment stage I, or in other words, a semipermeable membrane whose separation effect is increased over the ultra-filtering device 9. The membrane-/nano-filtering device 19/1 is, for example, of such a structure that NaCl dissolved in the sewage is retained in a proportion of by 30 to 70%.

In this way, substances that are difficult to decompose biologically or are not decomposable biologically are retained and concentrated in the retention flow 20/1 in the membrane-/nano-filtering device 19/1, after which the purified permeate 21/1 is collected via a permeate collecting-basin 22/1. Depending on demands made, the permeate flow is connected in different ways by means of a permeate pump 23/1 and valve control systems.

If the permeate meets the purification demands, it can be discharged from the plant as purified sewage 24/1. As the permeate performance is such that more permeate 21/1 is produced than is supplied to the plant as supply 11 or 14, respectively, the excess permeate 25/1 must be returned to the filtration collecting-basin 15/1 for operational reasons. If the desired level of concentration is achieved in the filtration collecting-basin 15/1, which may, for example, be controlled continuously by conductivity, turbidity measurement or an auto-analyzing device, either the concentrate is discontinuously or in batch quantities, respectively, or a partial flow is continuously supplied as concentrate 29/1 to the chemical and/or physical treatment stage IV by means of a concentrate pump 30/1.

If the filtering performance of the nano-filtration 19/1 drops, the filtering device, by appropriate valve control, may be rinsed free again by means of a rinsing circuit 26/1 which is fed from a rinsing collecting-basin 27/1 with water or permeate mixed with purifying agents.

If the permeate 24/1 does not meet the purification demands, the discharge 28/1 of the first nano-filtration stage II may be subjected to a nano-filtration stage III.

In the illustrated embodiment, the nano-filtration stage III has the same functions as the nano-filtration stage II, with components corresponding to each other in the drawing being provided with like reference numerals which are merely marked by . . . /2 instead of . . . /1 at the end.

In the illustrated embodiment a nano-filtration stage III with a nano-filtering device 19/2 is provided, which has the same functions as the nano-filtering device 19/1 of the nano-filtration stage II, availing, however, of an even increased separation effect. Thus, the construction of the nano-filtering device 19/2 of the nano-filtration stage III may for instance be such that NaCl contained in the sewage is retained by 50 to 90%. The operation corresponds to that of the first nano-filtration stage II.

This arrangement of the illustrated embodiment, having several units performing the same function, allows serially connecting in a plurality of stages to effect more and more intensified membrane separation, until the required retention of the substances of the organically loaded sewage which cannot be decomposed biologically or are not decomposable biologically is finally achieved.

The nano-filtering devices 19/1 and 19/2, respectively, are of such a construction for the method according to the invention that almost full retention of all difficulty decomposable or non-decomposable substances of biological relevance is obtained, so that merely substances that are dissolved solved having a low molecular weight, especially salts, are discharged with the treated sewage.

Optionally, just one single nano-filtration stage II may be provided, whose nano-filtering device 19/1 avails, however, of the increased separation effect of the nano-filtering device 19/2 of the nano-filtration stage III, which is of advantage especially if the sewage is to be purified from all particles down to the very small particle sizes as mentioned in connection with the nano-filtration stage III and if, however, these particles of (substances difficult to decompose biologically or which are not decomposable biologically) are present only in a relatively low concentration.

In a stage IV for the physical or chemical treatment of the concentrate, the concentrates 29/1 and 29/2, respectively, are supplied by means of concentrate pumps 30/1 and 30/2, respectively, to a reaction basin 31.

Apart from the reaction basin 31, the stage IV for the physical and/or chemical treatment of the concentrate comprises a reaction circuit formed by a reaction pump 38, an ultraviolet-exposure device 39 and an ozone treatment device 40, said circuit being closed by the reaction basin 31. Further, a chemical pump 44 is connected to the reaction basin 31 via a chemical conduit 45, so that from a chemicals supply device 43 flocculation and precipitation chemicals or other substances for the chemical or physical treatment of the concentrate can be supplied. In particulars such substances may be common flocculants and precipitants as well as adsorbents, such as activated carbon, bentonite or similar substances. Such chemicals or treatment agents can also be supplied into the reaction basin 31 via a supplying device 34. By the substances as mentioned, the adsorbable, persistent and biologically difficult to decompose substances can be adsorbed, made separable and extracted or destructed to such a degree that the concentrate 33, which is now biologically accessible, can be supplied via a charging pump 32 into the bioreactor 3 of the biological treatment stage I. For this purpose, the reaction basin 31 is circulated by means of a stirring device 35, and the adsorbed or chemically bound substances are subsequently discharged from the system 36 in a concentrated form obtained by sedimentation or filtration.

In addition to the chemical and/or physical treatment by the treatment agents added at 43 and 34, respectively, oxidatively changeable, biologically difficult to decompose or non-decomposable substances can be destroyed accordingly by use of oxidation agents. This happens in that the concentrate 37 is pumped through via the reaction pump 38 and treated in the ultraviolet-exposure device 39 and, subsequently, the ozone treatment device 40. Oxidants may also be supplied from the chemicals supply device 43 into the reaction basin 31 via the pump 44 and the conduit 45.

The method may alternatively be modified such that after reaching the desired concentration in the filtration collecting-basin 15/1 or 15/2, respectively, the concentrate 29/1 or 29/2, respectively, either is supplied discontinuously, i.e. in batch quantities, or a partial flow is supplied continuously by means of the concentrate pump 30/1 or 30/2, respectively, via a concentrate return line 45/1 or 45/2, respectively, directly to the biological treatment stage I. In the case of a partial return of the concentrate to the biological treatment stage, a partial flow of the untreated concentrate can be extracted directly via an extraction device 46/1 or 46/2, respectively.

In the case of a continuous treatment, the treated concentrate 33 can be returned via the charging pump 32, after the ultraviolet-exposure device 39 via the conduit 41, or after the ozone treatment device 40 via the conduit 42, into the bioreactor 3 in the biological treatment stage I. In this way the treatment stages I to IV can be closed to a quasi-closed circuit in which a continuous treatment of the sewage to be purified which is supplied at 1 takes place. The products obtained in this continuous treatment are discharged in the respective treatment stage, viz. the excess gas and the biological sludge from the biological treatment stage I at 7 and 13, respectively, the purified sewage from the nano-filtration stages II and III at 24/1 or 24/2 and 28/2, respectively, and the chemically and/or physically treated concentrate from the treatment stage IV at 36, depending in each case on the sequence of operation selected.

We claim:

1. A method of purifying sewage by separating said sewage into a retention phase concentrated with substances contained in said sewage and a purified liquid phase, by passing said sewage through a membrane-filtering device and subjecting said retention phase to biological decomposition, wherein the improvement comprises recirculating said retention phase through said membrane filtering device in said separation step until a concentrate having a desired degree of concentration of those substances that are difficult to decompose biologically or not decomposable biologically has been reached and processing at least a part of said concentrate in a physical and/or chemical treatment before being subjected to said biological decomposition.

2. The method according to claim 1 wherein a part of said concentrate is discharged.

3. The method according to claim 1 wherein said separation and concentration step is effected by filtration in a nanofiltering device.

4. The method according to claim 1 wherein said separation step and concentration are performed with a membrane-filtering device which is such that NaCl dissolved in the sewage is retained by 30 to 70%.

5. The method according to claim 1 wherein said separation step and concentration are performed with a membrane-filtering device which is such that NaCl dissolved in the sewage is retained by 50 to 90%.

6. The method according to claim 1 wherein said separation step and concentration are performed with a membrane-filtering device which is such that NaCl dissolved in the sewage is retained by 10 to 30%.

7. The method according to claim 1 wherein the concentration is carried out in a plurality of serially connected membrane-filtering devices.

8. The method according to claim 1 wherein the concentration is carried out in a continuous process of one or more stages of membrane-filtering devices until a predetermined, set-table concentration has been reached, and the permeate liquid phase obtained during filtration is drawn off as purified sewage when a predetermined degree of retention of said substances that are difficult to decompose or not decomposable has been reached or, when a sufficient degree of retention has not yet been reached, is subjected to a second or further stage of treatment in which the separation effect is further increased, until the desirable purification has been achieved and the permeate can be drawn off as purified sewage.

9. The method according to claim 1 wherein said concentrate is treated by ultraviolet radiation and/or a chemical oxidant.

10. The method according to claim 1 wherein said concentrate is treated with an adsorbent as well as a flocculent and/or precipitant.

11. The method according to claim 1 wherein a portion of said untreated concentrate is supplied for the purpose of its biological decomposition directly to a plant for biological sewage purification for aerobic or anaerobic transformation.

12. The method according to claim 1 wherein said physically and/or chemically treated concentrate for the purpose of its biological decomposition is supplied to a plant for biological sewage purification for aerobic or anaerobic transformation.

13. The method according to claim 12, wherein said physically and/or chemically treated concentrate is supplied to a plant for biological sewage purification, in which a microbic decomposition is carried through under overpressure and the treated sewage is separated from the biological sludge by membrane-filtration or ultra-filtration.

14. The method according to claim 1 wherein prior to separating and concentrating the substances that are difficult to decompose biologically or not decomposable biologically the sewage is subjected to biological decomposition.

15. The method according to claim 14 wherein prior to concentrating said substances that are difficult to decompose biologically or are not decomposable biologically, a biological decomposition of the biologically decomposable substances contained in the sewage is performed in a plant for sewage purification in which a microbic transformation is carried through under overpressure and the treated sewage is separated from the biological sludge by membrane filtration or ultrafiltration.

16. The method according to claim 1 wherein said separation step and concentration are performed by filtration in a membrane-filtering device including a nano-filter device, which is rinsed at intervals for the purpose of regeneration.

17. The method according to claim 1 wherein said concentration and said physical and/or chemical treatment of the concentrate is performed continuously.

18. The method according to claim 1 wherein said concentration and said physical and/or chemical treatment of at least a partial flow of the concentrate is performed continuously.

19. The method according to claim 1 wherein the durations during which the water, the substances that are easy to decompose biologically, the substances that are difficult to decompose biologically and the substances that cannot be decomposed biologically are in the purification process, in a water circuit formed by biological purification, membrane filtration, physical/chemical treatment and a bypass which by-passes the physical/chemical treatment, are decoupled from each other by the different retention of these substances in a membrane-filtering device.

20. The method according to claim 1 wherein the increases in concentration of the substances that are easy to decompose biologically and of the substances that are difficult to decompose biologically in the purification process in a water circuit formed by biological purification, membrane filtration, physical/chemical treatment and/or a bypass which by-passes the physical/chemical treatment, are decoupled from each other and concentration of the substances that are difficult to decompose biologically is increased to a level at which said substances can be decomposed biologically.

21. The method according to claim 20 wherein the function of setting and keeping desirable residual contents of substances is assigned to the membrane filtration or nanofiltration, respectively, in a water circuit formed by biological purification, membrane filtration or nanofiltration, and physical/chemical treatment.

22. The method according to claim 20 wherein the function of eliminating the sewage substances is assigned to the biological purification and to the physical/chemical treatment in a water circuit formed by biological purification, membrane filtration or nano-filtration, and physical/chemical treatment.

23. The method according to claim 1 wherein the functions of setting and keeping low residual contents of sewage substances as well as of eliminating the substances are operatively decoupled in the method.

24. The method according to claim 1 in which a major part up to almost all of the organic substances separated through membrane filtration or nano-filtration, respectively are difficult to decompose biologically or not decomposable biologically, wherein the destruction to biologically decomposable substances in the physical/chemical treatment step is carried out only to such an extent that no disagreeably high concentrations of substances will build up in the water circuit.

25. An apparatus for purifying sewage by separating said sewage with a membrane-filtering or nano-filtering device into a retention phase concentrated with substances contained in said sewage and a purified liquid phase, and further processing said retention phase in a biological decomposition stage, the improvement comprising a filtration collecting-basin connected in circuit with said membrane-filtering or nano-filtering device, recirculation means for recirculating said retention phase through said membrane-filtering or nano-filtering device and said filtration collecting-basin to establish therein a concentrate having a desired degree of concentration of those substances which are difficult to decompose biologically or not decomposable biologically, and a stage for physical and/or chemical treatment of at least a part of said concentrate interconnected between an output side of said filtration collecting-basin and said biological decomposition stage.

26. The apparatus according to claim 25 which comprises a pressure-loaded bio-reactor serving for microbically transforming the biologically decomposable organic substances of the sewage, to which the sewage containing both the biologically decomposable substances and the substances that are difficult to decompose biologically or not decomposable biologically is supplied on the inlet side, and a membrane-filtering or ultra-filtering device connected to said bioreactor and retaining the biological sludge developed in said bioreactor, from which the sewage freed from the biological sludge is drawn off on the outlet side and supplied to said filtration collecting-basin serving for concentrating the sewage substances that are difficult to decompose biologically or not decomposable biologically.

27. (amended) The apparatus according to claim 25 which comprises a conductivity determining device, a turbidity measuring device, or an analyzer device to be operated continuously for continuously controlling the nature of the concentrate.

28. The apparatus according to claim 25 which comprises a device for wet-chemical oxidation, which is combination of an ultraviolet-exposure device and a device delivering an oxidant, for destructing the substances that are difficult to decompose biologically or not decomposable biologically after the latter have reached a predetermined concentration.

29. The apparatus according to claim 25 which comprises a reaction basin in which persistent, substances, are further concentrated adsorptively, by means of activated carbon, bentonite, or by means of a flocculent and/or precipitant, and are removed from the chemical/physical treatment stage, and into which the concentrate is pumped after a predetermined concentration of the substances that are difficult to decompose biologically or not decomposable biologically has been reached.

30. The apparatus according to claim 25 wherein a partial flow of said concentrate is supplied to a device for wet-chemical oxidation in said treatment stage and is treated therein continuously.

31. The apparatus according to claim 25 wherein a plurality of serially connected filtration stages each comprising a membrane-filtering or nano-filtering device with a filtration collecting-basin connected thereto are provided.

* * * * *